June 9, 1953 — J. D. ROBINSON ET AL — 2,641,085

HEATER FOR FIELDS, ORCHARDS, AND THE LIKE

Filed Sept. 21, 1950

Inventors
JOSEPH D. ROBINSON
HENRY A. SIMPSON
By
Attorney

Patented June 9, 1953

2,641,085

UNITED STATES PATENT OFFICE 2,641,085

HEATER FOR FIELDS, ORCHARDS, AND THE LIKE

Joseph D. Robinson, Winter Park, and Henry A. Simpson, Oviedo, Fla.; said Simpson assignor to said Robinson Application September 21, 1950, Serial No. 186,042

6 Claims. (Cl. 47—2)

While the normal climates of certain areas of the United States, and other countries, are sufficiently mild for successful large scale culture of various delicate flowers, vegetables, fruits, shrubs and plants for marketing, nevertheless, constant vigilance is necessary to protect these crops from unexpected frosts and cold spells, etc.

These frosts and cold spells, though occurring seldom and being generally of short duration, nevertheless can wreak great damage upon the above crops as well as crop producing trees, shrubs, plants, etc. if no protection be afforded by way of artificial heat, applied during the dangerous period to the growth areas, or by way of cold insulation applied to the crop producing trees, shrubs or plants, during the danger periods.

This invention relates to outdoor heating and to the application of heat energy, in the form of infra-red rays, to growth areas during such above described emergency periods and, in particular, to the provision of a new and improved outdoor heater especially adapted for emergency use, as hereinbefore described, and particularly adapted to accomplish the new and improved method of heating, hereinafter described, forming also a part of our invention, as will hereinafter appear.

The transition or development of heating devices for the above described uses or purposes has extended, over many years, from simple receptacles containing smudge, smoke or "Smog" producing ingredients (even including outworn automobile tire casings, old cans, tanks and even trenches, ditches, etc., now banned by law in certain "tourist meccas") to such elaborate, expensive and intricate units as require electrical or internal combustion energy to operate fans, blowers, pumps, etc.

The most successful of these units are, at best, extremely expensive, difficult to service and maintain in operation and operative condition, and requires energy sources, such as portable or semi-portable engines, storage batteries and the like, to operate their fans, blowers and/or pumps.

According to our invention, we have obviated many of the difficulties incident to the use of such devices since we have provided a simple, relatively inexpensive, efficient heater structure operating efficiently upon various inexpensive gravity-fed liquid fuels and atmospheric air, and which operates in such manner as to carry out our new and improved method of heating fields, orchards, and the like, hereinafter fully described, illustrated and defined in the appended claims.

It is, therefore, a prime object of this invention to provide a new and improved heater of the above type, which is of a cheap, simple and durable construction, adapted for convenient cleaning, servicing and quick erection and disassembly and which will provide extreme efficiency in operation independently of electrical or other extraneous energy, such as is provided by storage batteries, mechanical pumps, etc., and in which the interior heater mechanism is readily accessible for cleaning and adjustment.

It is a further object of this invention to provide such a heater which comprises, in effect, a casing adapted for the controlled ingress of atmospheric combustion supporting air, which casing is provided with a constricted throat enclosing a burner device or mechanism receiving and injecting into the constricted throat portion of the casing, gravity-fed oil or heavy hydrocarbon material, which is injected into and thoroughly mixed with uprising atmospheric air, drawn upwardly by combustion occurring above the burner mechanism, which combustion generates infra-red heat energy radiated through the walls of the casing over exterior areas to be protected, in the direction desired.

An important feature of the above described structure is the cooperation of the burner mechanism or device with the casing, and particularly the constricted throat portion thereof, to create a vacuum which draws heated gravity-fed liquid fuel from the burner unit, converts it into fine sprays directed radially and/or outwardly from the burner into the air passing upwardly through the throat portion or zone while thoroughly mixing the fuel (in fine particles) with the air, the fuel-air suspension passing thence upwardly, through an ignition zone, into a combustion and radiant heat transfer zone.

These and other objects and advantages of the invention will clearly appear from the following description, and the accompanying drawing forming a part thereof, and will be pointed out in the appended claims.

Figures 1, 2, 3:
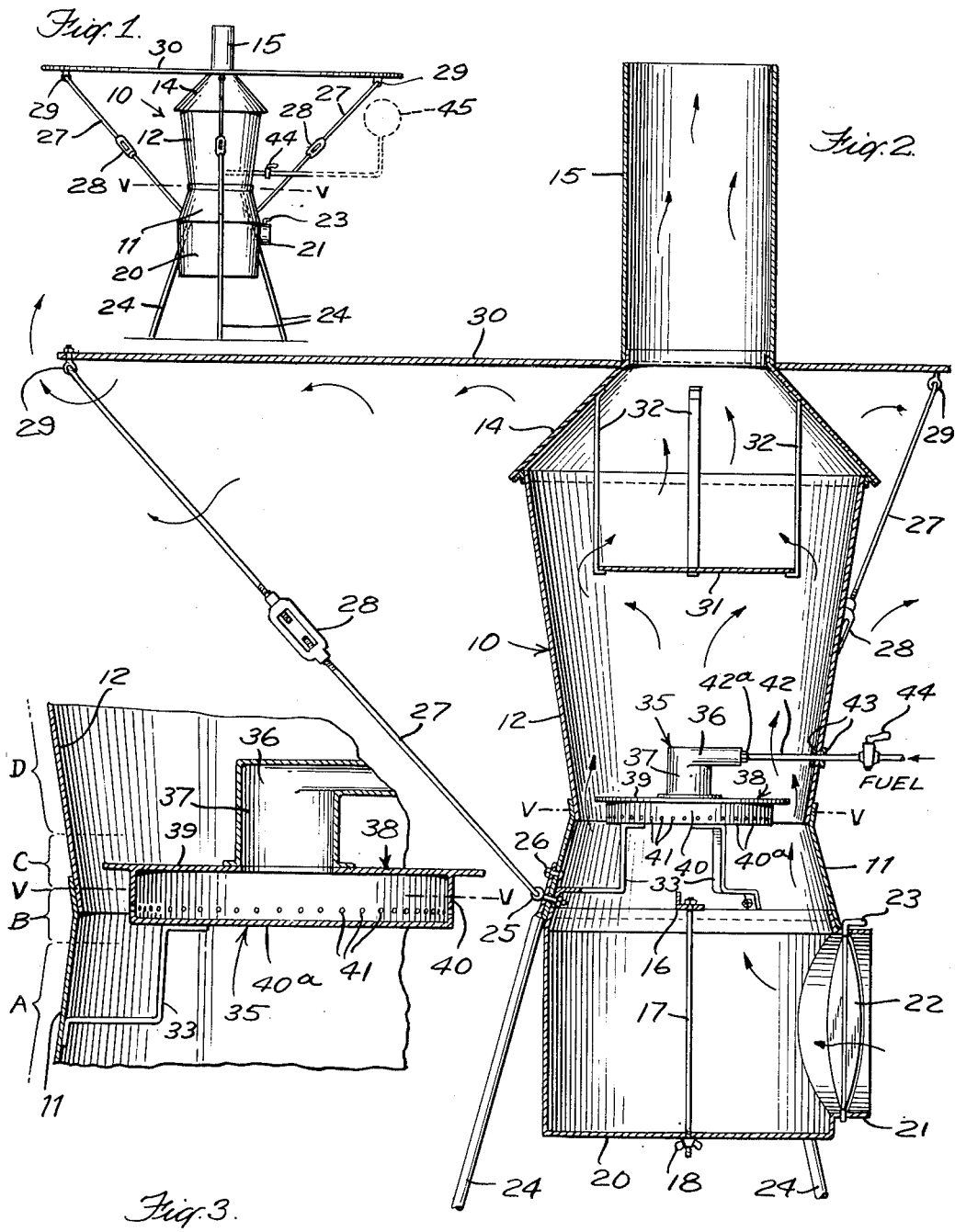
Fig. 1 is a somewhat diagrammatic view of a preferred embodiment of our heater illustrating, in dash lines, the manner in which fuel is fed by gravity thereto.
Fig. 2 is a fragmentary vertical section of the heater shown in Fig. 1.
Fig. 3 is an enlarged, diagrammatic view illustrating the relationship of the burner unit with respect to the casing of the heater, and particularly the constricted throat portion thereof.

In the illustrative embodiment shown in Fig. 1, the shell, casing, or housing of the heater is generally designated 10 and comprises an upward and inwardly tapering frusto-conical skirt 11 supporting an upwardly and outwardly flaring annular heat radiating wall 12, rigidly secured thereto, preferably by welding. This heat radiating wall 12, in turn, supports an upwardly and inwardly tapering annular roof skirt 14, rigidly secured thereto as by welding. The roof skirt 14, in turn, supports the annular stack 15, rigidly secured thereto as, for instance, by welding.

Disposed internally of the skirt 11, adjacent the lower end thereof, is a transverse supporting bracket 16 having therein an aperture accommodating the elongated rod or bolt 17 provided with a wing nut 18 at its lower end. This rod or bolt 17 supports a cup-like chamber member 20 which forms the priming chamber of the heater. As will be readily understood from Fig. 2, the entire chamber 20 may be readily and conveniently attached to and detached from the lower end of the skirt 11, for access to the interior of the skirt 11 and heat radiating wall 12 for cleaning the burner apparatus of the heater with convenience. At one side, the removable or detachable chamber casing 20 is provided with an air intake duct 21, which is provided with a butterfly valve 22 having control handle 23 at its upper end, by means of which the quantity of air entering the chamber 20 for supporting combustion within the casing or housing 10 may be conveniently and closely controlled.

Detachably secured to the skirt 11 are a plurality of legs or leg members 24 of desired length. As shown, the legs or leg members 24 are secured by means of eye-bolts 25 and bolts 26, although other known means may be used, if desired. The eye-bolts 25 serve a multiple purpose in that, in addition to their function in securing the legs 24 to the skirt 11, they support the brackets 33 (hereinafter described) as well as one end of the stay rods 27 which rods are provided with turn buckles 28 and with eye-bolts 29 at their opposite ends for securing the stay bolts 27 to the peripheral portions of the reflector 30, which reflector is optional.

It is particularly to be noted that the shell, casing, or housing 10 is of extremely simple construction and that the lower end thereof is closed by the cuplike detachable inlet chamber forming member 20, whereby removal of the member 20 affords extreme accessibility to the interior of the casing 10 for removal of soot and other residues of combustion, as well as for convenience in adjusting the interior burner apparatus; as well as for removal and replacement thereof.

In order to guide or deflect the upwardly rising gases and/or products of combustion outwardly toward the heat radiating wall 12, the interior of the shell or casing 10 is provided with a plate damper 31 suspended by a plurality of hangers or straps 32 from the roof skirt 14, to which they are preferably rigidly secured, as by welding, the opposite ends thereof being secured in like manner (or detachably, if desired) to the plate forming the damper 31. Rigidly and detachably secured at their lower ends in the frusto-conical skirt 11, by eye-bolts 25 as described above, are a plurality of supports or brackets 33 which provide a rest upon which the burner unit, generally designated 35, is loosely supported, although means (not shown) may be provided for securing the burner unit to the brackets other than by gravity.

This burner unit comprises three superposed chambers; the upper or carburetor chamber 36 conducts incoming combustion fuel, such as heavy oil or other inexpensive, available petroleum products, downwardly to the intermediate riser or chamber 37. This chamber or riser 37 leads centrally into the secondary or distributor chamber 38, having its upper wall formed by the spreader or diffuser plate 39, which plate 39 extends peripherally beyond the annular side-wall 40 which leads downwardly to the bottom wall 40ª and which side-wall 40 is provided, intermediate its height, with a plurality of fine spray apertures or holes 41 adapted to supply heavy liquid fuel (preheated in chambers 36 and 37) in fine sprays radially outwardly into the constricted portion of the interior of the shell or casing 10. The small particles in these sprays are injected into and thoroughly mixed with the swiftly rising air admitted through the valve 22 into and through the chamber 20 and thence upwardly through the interior of the skirt 11.

The level or plane of the apertures 41 is located closely adjacent to the plane V—V of the throat formed by the intersection of the oppositely flaring skirt 11 and heat radiating wall 12. Preferably, these holes or apertures 41 are disposed very slightly above the most constricted portion of the throat formed by this oppositely flaring relationship of the joining or intersection skirt 11 and heat radiating wall 12.

Leading to the carburetor chamber 36 through a reinforced aperture 43 in the wall 12 is a fuel pipe or conduit 42 which is provided with a manually operable valve 44 by means of which the rate of fuel supply to and through chambers 36, 37 and 38, 39, 40 and the spray apertures 41 may be closely controlled and balanced with the air supply under control of the valve 22, in order to secure optimum efficiency of combustion. The fuel supply conduit or pipe 42, as shown in Fig. 1, leads upwardly to a suitable source of gravity-fed fuel, generally designated 45 in Fig. 1.

As will be readily understood, the burner unit 35 is extremely accessible for cleaning and/or removal and replacement, since it is merely necessary to remove the wing nut 18 from the chamber supporting rod 17, whereupon the unit comprising chamber 20, butterfly valve 22, and handle 23 may be removed from the remainder of the shell or casing 10 in order that a wire brush or other suitable tool may be used to clean the side-wall 39 and bottom-wall 40 of the unit 35.

If it is desired further to inspect or clean other parts of the interior of the shell or casing 10, the nut 42ª connecting the fuel inlet pipe or conduit 42 with the chamber 36 is removed, whereupon the entire unit 35 may be raised, tilted, and removed past the bracket or support 33 through the open lower end of the skirt 11 and the casing proper. As described above, the lower ends of the brackets or supports 33 are detachably secured to the skirt 11 by the eye-bolts 25 which also secure the legs 24 and the stray rods 27 in place. Thus, by removal of these supports or brackets 33, the entire interior of the shell or casing 10 may be reached for inspection and/or cleaning.

It is further to be noted that the inlet chamber 20, rod 17 and legs 24 may be removed to enhance portability and that the deflector 30 may be readily and conveniently removed by disconnecting the stay rods 27 from the eye-bolts 25 and 29, whereupon the deflector or reflector may be moved upwardly beyond the stack 15 for removal.

In many cases, it is preferred to omit the reflector or deflector 30 in order that infra-red rays may be radiated, unobstructedly by the roof skirt 14, as well as the heat radiating wall 12. This is particularly advantageous in supplying infrared heat energy to orchards, where the trees are higher than the tops of the heaters. It is, of course, to be understood that the reflector or deflector may be of any desired shape as, for instance, "dished" or of relatively conoidal or spheroidal shape.

As shown in Fig. 3, we have indicated four superposed zones designated A, B, C, D.

The lowermost zone, designated A, is the controlled air admission zone, which receives air from the inlet 21 under control of the valve 22 and directs this air upwardly while concentrating it (because of the frusto-conical nature of the skirt 11 which defines the outer wall of this zone).

The secondary vacuum or mixing zone B, immediately above the air admission zone A, is disposed partly within the interior of the skirt 11 and extends upwardly beyond the plane of the throat indicated V—V to a height slightly above the plane of the aperture 41 and slightly below the plane of the deflector or diffuser plate 38. The relationship between the peripheral edge of plate 38, the inclined adjacent heat radiating wall 12, and the plane V—V of the throat is such that the rapidly moving air passing through the space between the peripheral edge of the plate 38 and the adjacent inclined wall 12 creates a vacuum which is additive to the force of gravity to draw the heavy fuel through the fine apertures 41 which break it up into fine sprays and inject it, in very fine particles, into the swiftly moving stream of air.

Immediately above the vacuum zone B is the ignition zone C, wherein the mixture created by mixing fine particles of fuel with air in zone B reaches the burning gases in the combustion zone (hereinafter described) and is ignited.

The combustion zone D extends upwardly from the ignition zone C and the burning gases in this zone transfer heat energy to the heat radiating wall 12 and the roof skirt 14 under control of the damper 31 which obstructs free passage to the stack 15 to such extent that efficient heat transfer to the wall 12 is effected.

It is to be noted that the burner chambers 36 and 37 are within the ignition zone C and combustion zone D, which insures that the heavy liquid fuel supplied to the chambers 38 therebelow for disbursal through the fine apertures 41 is extremely hot and readily dispersible or convertible into fine sprays and thereafter, by admixture with the swiftly moving rising air stream, into a readily combustible state.

Furthermore, the relation and cooperation of the diffuser plate 39, throat and apertures 41 is such that the products of combustion are brought into direct contact with the root or lower end of the heat radiating wall 12 and their expansion and upward component maintain them in contact therewith throughout their travel for utmost efficiency of heat transmission while obviating the necessity for "targets" or baffles above the diffuser plate for controlling the path of the products of combustion without recourse to "targets" or baffles above the diffuser plate.

In order to start the operation, it is merely necessary to inject a quantity of fuel, or an amount of fuel-impregnated waste or the like, through the butterfly valve 22 into the chamber 20 and ignite the same. Thereafter, after the unit 35 has been sufficiently heated by the combustion in the chamber 20, the fuel control valve and air control valve 22 may be opened and adjusted for proper balance between the air and fuel supplies to cause the combustion to begin and proceed efficiently.

From the above description, it will clearly appear that we have provided a new and improved method of outdoor heating for protection of crops, trees, shrubs, plants, etc. by utilizing inexpensive heavy fuels of the cheapest and most readily available types fed by gravity and injected in small readily combustible particles into high velocity air columns, produced totally without mechanical devices or mechanisms, such as pumps or blowers requiring electrical or other power sources, and that we have also provided a new and improved heater construction of extreme simplicity, efficiency and low cost, particularly adapted to the accomplishment of the aforesaid method.

It is particularly to be noted that the diffuser plate 39 in directing the products of combustion into direct contact with the wall 12 obviates the necessity for "targets," baffles etc. above the burner unit for controlling the path of the products of combustion.

It is, of course, to be understood that the above description is merely illustrative, and in nowise limiting and that we desire to comprehend within our invention such modifications as are included within the scope of the following claims.

Having thus fully described our invention, what we claim and desire to secure by Letters Patent is:

1. In a heater of the class described, a casing for confining a column of uprising air and having an inlet leading to the atmosphere adjacent to its lower end, a burner unit disposed intermediate the interior height of said casing and comprising a diffuser plate substantially concentric with the casing and extending outwardly into close proximity with the interior of the casing wall to define a restricted path portion between said diffuser plate and the interior of said wall, a distributing chamber below said diffuser plate having a substantially vertical wall with radially spaced fine apertures directed outwardly toward said wall and disposed in a plane below the plane of said diffuser plate, and a fuel preheater chamber above said diffuser plate communicating with a source of gravity-fed fuel and with said distributing chamber.

2. The structure defined in claim 1, said preheater chamber being disposed in the fuel combustion zone of said heater and supplying heated fuel to said distributor chamber.

3. In a heater of the class described, an annular casing for confining a column of uprising air and having a valve controlled inlet leading to the atmosphere adjacent to its lower end, and having a constricted throat portion intermediate its height, a burner unit disposed in said constricted throat portion and comprising a substantially concentric annular diffuser plate extending outwardly into close proximity with the interior of the constricted casing wall portion to define a restricted path between said diffuser plate and the interior of said wall, a distributing chamber below said diffuser plate having an annular substantially vertical wall with radially spaced fine apertures directed outwardly toward said constricted wall portion and disposed in a plane below the plane of said diffuser plate, and a fuel preheater chamber above said diffuser plate communicating with a valve controlled source of gravity-fed fuel, said preheater chamber being disposed in the combustion supporting and radiating zone of said heater and supplying heated fuel to said distributor chamber, the combustion in said combustion zone creating a vacuum zone in said casing immediately below said diffuser plate and adjacent to said apertures which vacuum is additive to the force of gravity for drawing heated fuel from said distributor chamber in fine sprays of readily combustible fuel particles of slight mass directed across the path of uprising air adjacent thereto and said combustion also causing an upward air draft from the atmosphere through said valve controlled inlet.

4. The structure defined in claim 3 wherein said burner cooperates with the constricted portion of said casing wall to form a fuel-air mixing zone, with a combustion supporting and heat radiating zone thereabove, and an air admission zone therebelow.

5. In an outdoor heater of the class described, a casing comprising an upwardly and inwardly tapering annular skirt, an upwardly and outwardly tapering heat radiating wall fixed to said skirt and forming therewith a throat, a cup shaped casing member detachably secured to said skirt therebeneath and provided with a valve controlled inlet leading to the atmosphere, roof and stack forming members fixed to said heat radiating wall at its upper end and forming therewith a combustion chamber above said throat, and a burner unit in said casing adjacent to said throat and cooperating therewith for supplying sprays of finely divided preheated fuel thereto for admixture with air passing upwardly through said throat into said combustion supporting chamber thereabove, said burner unit comprising a substantially concentric annular diffuser plate extending outwardly into close proximity with the casing wall adjacent to said throat, a fuel distributing chamber below said diffuser plate having an annular substantially vertical side wall with radially spaced fine apertures directed outwardly toward said casing wall in a plane very slightly above said throat and slightly below the plane of said diffuser plate, and a fuel preheater chamber communicating with said fuel distributing chamber through said diffuser plate, said fuel preheater chamber being disposed within the combustion zone of said heater and being connected with a valve controlled source of gravity-fed fuel.

6. The structure defined in claim 5, said burner unit being supported by gravity on bracket means removably attached to said tapering annular skirt, and being readily accessible and removable upon detachment from said tapering annular skirt of the cup shaped casing member bearing said valve controlled air inlet.

JOSEPH D. ROBINSON.
HENRY A. SIMPSON.

References Cited in the file of this patent
UNITED STATES PATENTS

| Number | Name | Date |
|---|---|---|
| 1,317,959 | Cobb | Oct. 7, 1919 |
| 1,357,314 | Cobb | Nov. 2, 1920 |
| 1,437,149 | Minetti | Nov. 28, 1922 |
| 1,449,311 | Beard | Mar. 20, 1923 |
| 1,536,792 | Howard | May 25, 1925 |
| 1,571,969 | Ruprecht | Feb. 9, 1926 |
| 2,223,597 | Brewster | Dec. 3, 1940 |
| 2,522,935 | Farrall | Sept. 19, 1950 |
| 2,577,410 | Farrall | Dec. 4, 1951 |